Jan. 7, 1964   R. E. RICHARDSON   3,116,993
GLASS BENDING
Filed Feb. 4, 1959   3 Sheets-Sheet 2

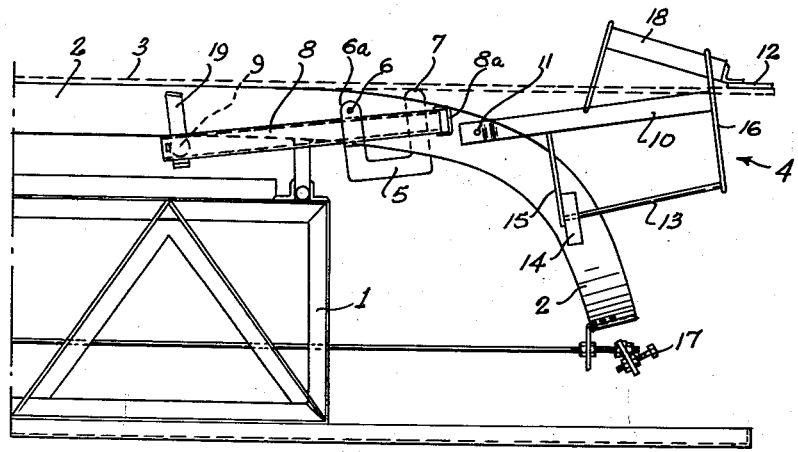
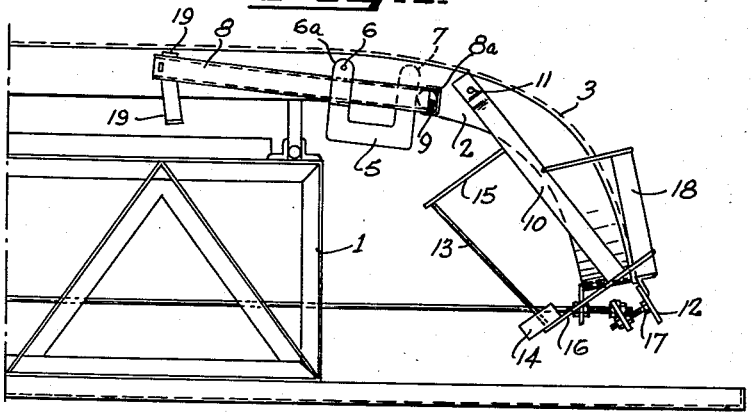
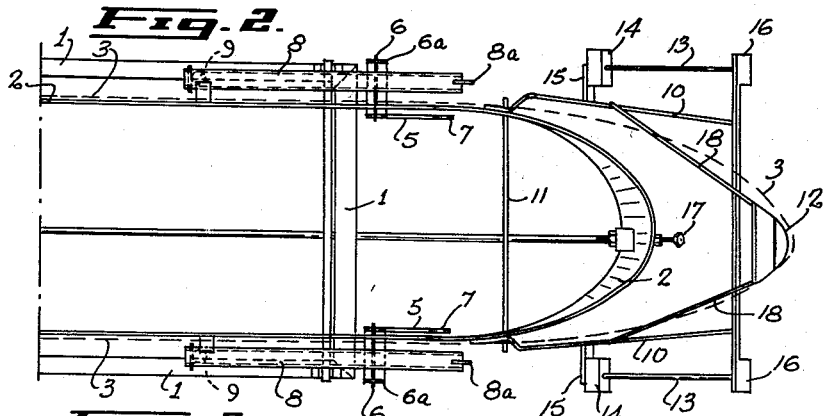

RONALD E. RICHARDSON

BY Cushman, Darby & Cushman
ATTORNEYS

United States Patent Office 3,116,993
Patented Jan. 7, 1964

3,116,993
GLASS BENDING
Ronald E. Richardson, Oshawa, Ontario, Canada, assignor to Pittsburgh Plate Glass Company, Pittsburgh, Pa.
Filed Feb. 4, 1959, Ser. No. 791,071
2 Claims. (Cl. 65—107)

This invention relates to glass bending.

In particular the invention is concerned with the bending of glass sheets to the form required for automobile windshields and rear windows, of the so-called "wraparound" type, in which the major portion of the windshield is bent with a comparatively gentle curvature, while the radius of curvature rapidly decreases at each end of the glass sheet until the end sections extend in planes almost parallel to one another and perpendicular to the main body of the sheet.

The principal object of the invention is the provision of supporting means for exerting a force against the undersurface of the glass sheet to provide support for the same between points at which pressure is applied to the glass during a first stage of a heating and bending process while the glass sheet is still relatively free from susceptibility to deformation, said supporting means being such as to cease to exert such force upon positive movement of the glass a predetermined distance against such force and before the onset of a second stage of the heating and bending process during which the glass sheet is more susceptible to deformation by virtue of its increased temperature. According to an illustrative embodiment of this invention, this self-retractability is obtained by means of a simple over-centre mechanism of the ball and race type.

The present invention provides, in a method of bending glass sheets wherein a flat glass sheet is supported in a substantially horizontal plane by a curved shaping surface and also at additional points intermediate its longitudinal extremities, which additional points are in said substantially horizontal plane and above said curved shaping surface, and wherein said glass sheet is heated to its softening point and bent into a final configuration conforming to said shaping surface by heat sagging, the improvement comprising maintaining said intermediate support points in contact with the glass sheet during a first stage of bending wherein the glass sheet sags part way toward said shaping surface and is relatively free from susceptibility to deformation from contact by said support points, retracting said intermediate support points from contact with the glass after the glass sheet has sagged part way between its initial flat position and its final configuration in contact with said shaping surface and when said glass sheet has been heated to be more susceptible to deformation from said contact than during said first stage, and maintaining said intermediate support points out of contact with said glass sheet during a second stage of bending wherein the glass sheet completes its bending to its final configuration.

The invention may be carried into practice as illustrated in the accompanying drawings in which:

FIGURE 1 shows a side elevation of one-half of a convex type glass bending mould with a glass sheet in position prior to bending;

FIGURE 2 shows the same parts as FIGURE 1 in the position taken up after bending of the glass;

FIGURE 3 shows a plan view of these parts in the position of FIGURE 1;

Figure 4:
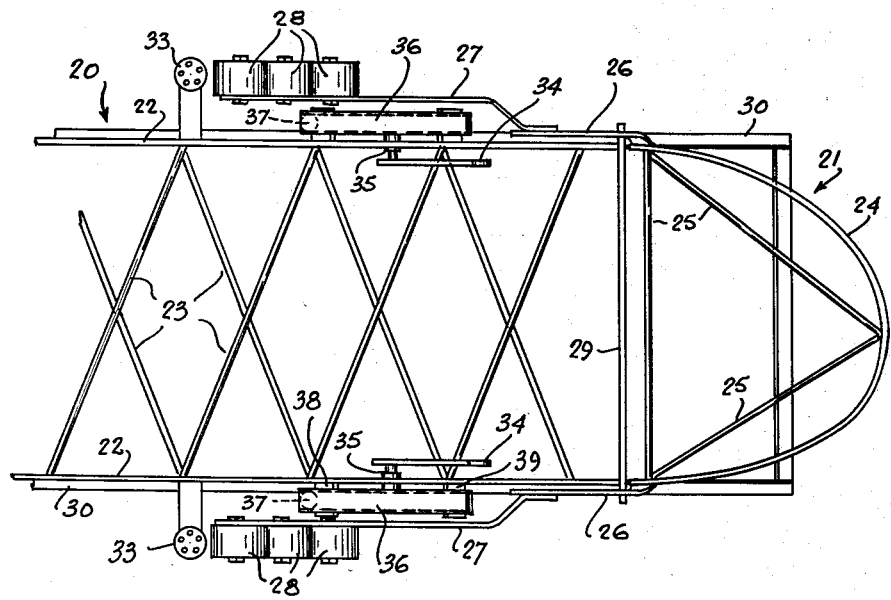
FIGURE 4 shows a plan view of one-half of a concave type glass bending mould ready to receive a glass sheet in position prior to bending.
Figure 5:
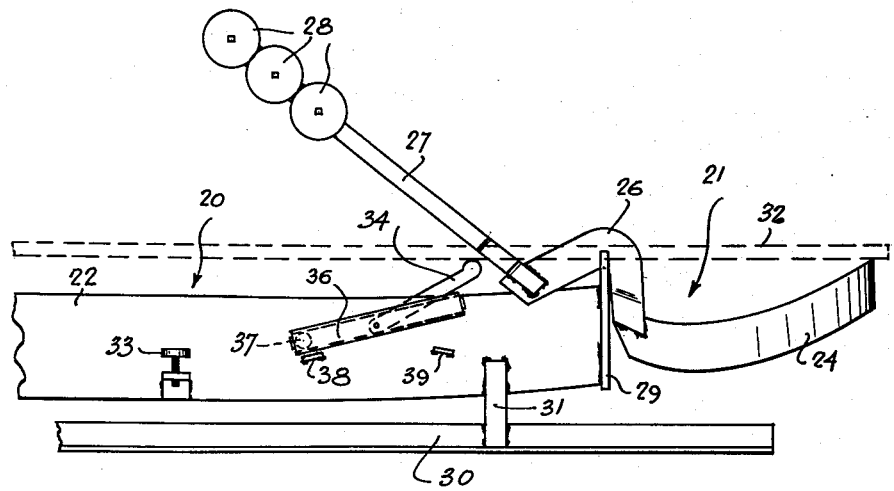
FIGURE 5 shows a side view of FIGURE 4 with the flat glass sheet in position prior to bending.
Figure 6:
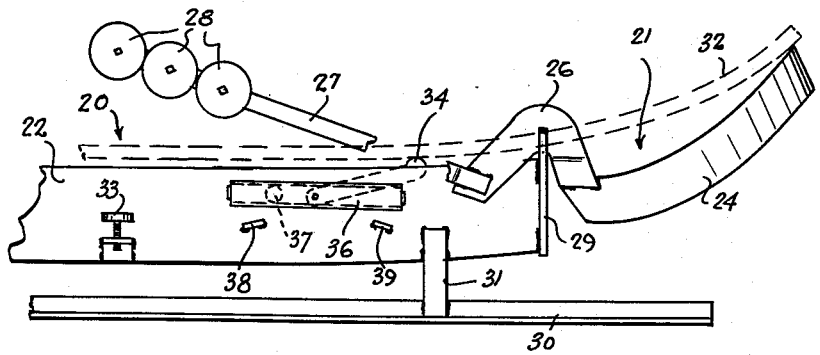
Figure 7:
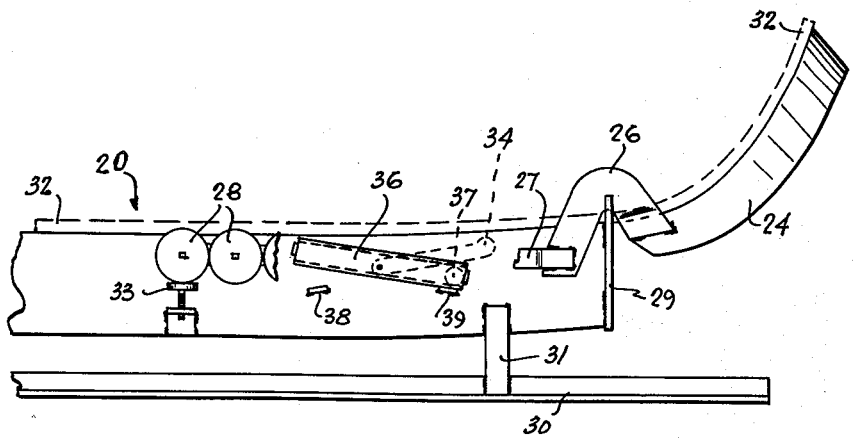

FIGURE 6 corresponds to FIGURE 5 after completion of a first stage and before the onset of a second stage in the bending process; and FIGURE 7 is a similar view to FIGURES 5 and 6 but showing the positions of the parts on completion of the bending process.

The other half of each of the moulds illustrated is identical in mirror image.

The convex mould of FIGURES 1 to 3 will first be described. A framework 1 supports a conventional convex moulding surface 2 in the form of a closed rim. The flat elongated glass sheet 3 to be bent is placed horizontally along the top of the surface 2 in the usual way, so as to be supported at its central edges by such surface.

Glass bending means in the form of a device shown generally at 4 is provided at each end of the moulding surface 2 to exert a downward pressure on the two spaced apart end portions of the glass to bend such end portions downwardly when the glass is sufficiently heated. Heating is carried out by passing the apparatus as a whole through a furnace in the conventional manner. This device 4 consists of a general framework 10 pivotally mounted on the moulding surface 2 by a rod 11 and carrying a primary pressure member 12 disposed above the extreme end of the glass sheet 3. The lower part of the framework 10 includes a pair of rods 13 along each of which a weight 14 can slide in the longitudinal direction of the mould between positions determined by members 15 and 16 of the framework 10. The rods 13 are so inclined that, in the position seen in FIGURES 1 and 3, i.e., prior to bending of the glass, the weights 14 abut against the members 15 and thus exert a turning moment on the framework 10 determined by the horizontal distance of these weights from the rod 11. This turning moment is effective to exert a downward force on the extreme end of the glass through the primary pressure member 12. As the glass softens, on the application of heat, this force bends the end of the glass downwardly, until the position seen in FIGURE 2 is ultimately reached, the primary pressure member 12 having moved beyond the end of the glass to rest on an adjustable stationary stop 17 and the function of the primary pressure member 12 having been taken over by a pair of spaced bars 18 which also forms part of the framework 10. During this downward tilting, the weights 14 will have travelled along the rods 13 to bear against the members 16. This movement will have the effect of tending to increase the lever arm through which the weights 14 act and thus counteracting the diminution of such lever arm consequent upon tilting of the framework 10. This device 4 is believed to constitute a separate invention which has been claimed in Pittsburgh Plate Glass Company's United States patent application No. 423,386, filed April 15, 1954 (inventors— William C. McRoberts and James S. Golightly), now abandoned.

The novel feature of the present invention is the provision of glass supporting mechanisms situated at points intermediate between the central part of the moulding surface 2, where a comparatively even support for the centre of the flat glass sheet 3 is provided, and each extreme end of the glass where pressure is applied by the device 4, such supporting mechanisms being so arranged as to provide a self-retractable support for the glass at such intermediate points.

The form of the invention illustrated in FIGURES 1 to 3 of the drawings shows such supporting mechanisms as comprising a pair of U-shaped arms 5 each pivoted at one end about a pin 6 to one longitudinal side member of the moulding surface 2. Each arm 5 is arranged adjacent a span of the moulding surface 2 and just inwardly thereof, so as to bear with its free end 7 against the underside of the glass sheet 3. The free ends 7 of the two arms 5 thus provide glass supporting means to support the sheet 3 at two points spaced apart across the mould and thus constitute glass supporting means. Such support is provided at regions intermediate the end portions of the glass and out of contact with the moulding surface. By means of the pins 6 secured each to a bracket 6a arranged outside the longitudinal side member of the moulding surface 2, each arm 5 is connected to an elongated tube 8. A ball 9 is positioned in each tube 8 so as to be free to roll therealong.

In the position seen in FIGURES 1 and 3, i.e., prior to bending, the free ends 7 of the two arms 5 of each supporting mechanism provide support for the undersurface of the glass sheet 3, the arms being held firmly in this position by the weight of the tubes 8 and the balls 9 which latter are situated in the ends of the tubes 8 remote from the glass supporting means (arm ends 7). Movement of these remote ends is limited by stops 19 secured to the moulding surface 2. Each tube 8 is so secured to its arm 5 that, in this position, it is slightly inclined to the horizontal to retain the ball 9 at such end. In this position the tubes 8 and balls 9 serve as loading means to press the free ends 7 of the arms 5 upwardly to provide support for the spans of glass extending between the centre of the mould and the two extreme ends, at points where the bending stresses in the glass caused by the devices 4 are high.

As the glass is heated and each device 4 acts to bend an end thereof downwardly, additional downward pressure is exerted on the free ends 7 of the arms 5 sufficient to overcome the upward force on the glass provided by the weight of the tube 8 and balls 9. The arms 5 thus gradually swing downwardly to the position seen in FIGURE 2, which shows the glass in its final bent form. During this movement the inclination of the tubes 8 becomes reversed so that each ball 9 rolls from its original position to take up a position at the other end of its tube, i.e., the end nearer the free end 7 of the respective arm 5. The balls are prevented from falling out of the tubes 8 by U-bars 8a. In this position the weight of the balls 9 acts as actuating means to rotate the free ends 7 of the arms 5 downwardly so that they lie below the shaping surface presented by the moulding surface 2 and out of pressure contact with the glass sheet 3. This removal of pressure is important as avoiding any undesirable deformation of the glass when it is in the most pliable state reached during the heating process. Thus, the bending operation comprises a first stage wherein the sheet is relatively free from susceptibility to deformation from contact by the free ends 7 of the arms 5 and a second stage wherein the sheet has been heated to be more susceptible to deformation from such contact than during said first stage. The free ends 7 of the arms 5 are maintained in contact with the sheet during said first stage of bending but are retracted from contact with the sheet and maintained out of contact therewith during said second stage of bending. During the second stage of bending the free ends 7 of the arms 5 are maintained below the shaping surface presented by the moulding surface 2 and are therefore well spaced from the glass sheet.

The tube 8 and the ball 9 thus constitute loading means urging the glass supporting means (ends 7 of the arms 5) upwardly, the ball 9 constituting actuating means for reversing the direction of action of the loading means, such loading means being sensitive to the position of the glass supporting means.

Clearly the essential feature of the supporting mechanisms is this self-retractability, which, although it could be accomplished by a trip mechanism, is preferably, for simplicity and ruggedness, effected by means of an over-centre mechanism of the type already described. Other forms of such an over-centre mechanism may be substituted for the one described. For example, other slidable or movable weighted parts may be substituted for the balls 9, or a weight may be fixed to an upwardly projecting member arranged to rotate with each arm 5 and to move from one side to the other of the vertical on rotation of such arm from its upper to its lower position, and vice versa. While over-centre mechanisms may be spring loaded, it is preferred to avoid the use of springs in view of the temperatures to which moulds of the type just described are subjected.

The applicability of the invention to a concave mould is illustrated in FIGURES 4 to 7. These figures show a concave mould having a main mould portion 20 and two movable end mould portions, the end mould portion visible in the drawings being shown at 21. The main mould portion 20 comprises side bars 22 and bracing members 23, side bars 22 forming the moulding surface. The end mould portion 21 has a moulding surface formed from a bar 24, and also includes bracing members 25. The bar 24 is connected to arched plates 26 which in turn have secured to them arms 27 carrying weights 28. These weights 28 urge the movable end portion 21 towards the curved position shown in FIGURE 7, such end portion 21 being moved to that position by rotation of the arched brackets 26 over the ends of vertically disposed plate 29 which extends between the ends of side bars 22. The main mould portion 20 includes a frame base 30 to which the side bars 22 are connected by legs 31. Glass sheet 32 is mounted on this skeleton type mould in a conventional manner. The glass is then subjected to the hot atmosphere of a bending furnace which permits the weights 28 to turn the end portions 21 to their curved orientation, the glass being bent from the flat form shown in FIGURE 5, through the intermediate stage of FIGURE 6, to the final curved configuration of FIGURE 7 by means of the upward force exerted by the end portions 21. The final limit of this movement is determined by stops 33.

This mould is fitted with two glass supporting mechanisms at each end of the mould similar to those of the convex mould illustrated in FIGURES 1 to 3. Such mechanisms each comprise a glass supporting means in the form of an arm 34 which contacts the glass adjacent a lateral edge slightly inwardly of side bars 22. There are two such supporting mechanisms on each side of the mould and these mechanisms provide elevated supporting surfaces for the glass sheet 32 intermediate the support given to the glass by the tips of the two end mould portions 21. As in the previous embodiment, each arm 34 is connected through a spindle 35 to a tube 36 in which a ball 37 can travel. In the flat position of the mould seen in FIGURES 4 and 5, each ball 37 is at the end of the tube 36 remote from the adjacent end portion 21, and is effective to hold its associated arm 34 in an upward glass suppporting position. Limit of this travel is determined by stop 38 in the absence of the glass sheet 32. The mould and glass are then subjected to the hot atmosphere. After some time a position generally as shown in FIGURE 6 is reached with the glass partially bent and the ball 37 just on the point of travelling towards the other end of the tube 36. As soon as this has happened, the arm 34 is positively withdrawn from pressure engagement with the glass to the position shown in FIGURE 7. Stop 39 determines the limit of this movement. It will be apparent that the tubes 36 function similarly to the tubes 8 of the embodiment of FIGURES 1 to 3, and that the balls 37 perform the function of the balls 9. It will also be appreciated that the bending operation described with respect to FIGURES 4 to 7 involves a first stage of bending wherein the sheet is relatively free from susceptibility to deformation from contact with the arms 34 and a second stage wherein the sheet has been heated to be more susceptible to deformation from such contact. The arms 34 are maintained in contact with the sheet during the first stage of bending but are retracted from contact with the sheet and maintained out of contact therewith during the second stage of bending. The completion of the first stage of bending is depicted in FIGURE 5 where the ball 37 is on the point of travelling towards the other end of the tube 36 to withdraw the arm 34 from engagement with the glass to the position shown in FIGURE 7. In this position, which is maintained throughout the second stage of bending the arms 36 lie below the shaping surface and hence are spaced from the glass sheet.

This application is a continuation-in-part of application Serial No. 562,327, filed January 30, 1956, now abandoned.

I claim:

1. In a method of bending glass sheets wherein a flat glass sheet is supported in a substantially horizontal plane by a curved shaping surface and also at additional points intermediate its longitudinal extremities, which additional points are in said substantially horizontal plane and above said curved shaping surface, and wherein said glass sheet is heated to its softening point and bent into a final configuration conforming to said shaping surface by heat sagging, the improvement comprising maintaining said intermediate support points in contact with the glass sheet during a first stage of bending wherein the glass sheet sags part way toward said shaping surface, and is relatively free from susceptibility to deformation from contact by said support points, retracting said intermediate support points from contact with the glass after the glass sheet has sagged part way between its initial flat position and its final configuration in contact with said shaping surface and when said glass sheet has been heated to be more susceptible to deformation from said contact than during said first stage, and maintaining said intermediate support points out of contact with said glass sheet during a second stage of bending wherein the glass sheet completes its bending to its final configuration.

2. In a method of bending glass sheets wherein a flat glass sheet is supported in a substantially horizontal plane by a curved shaping surface and also at additional points intermediate its longitudinal extremities, which additional points are in said substantially horizontal plane and above said curved shaping surface, and wherein said glass sheet is heated to its softening point and bent into a final configuration conforming to said shaping surface by heat sagging, the improvement comprising maintaining said intermediate support points in contact with the glass sheet during a first stage of bending wherein the glass sheet sags part way toward said shaping surface and is relatively free from susceptibility to deformation from contact by said support points, retracting said intermediate support points from contact with the glass to below said shaping surface at the completion of said first stage of bending and after the glass sheet has sagged part way between its initial flat position and its final configuration in contact with said shaping surface and when said glass sheet has been heated to be more susceptible to deformation from said contact than during said first stage, and maintaining said intermediate support points below said shaping surface and out of contact with said glass sheet during a second stage of bending wherein the glass sheet completes its bending to its final configuration.

References Cited in the file of this patent

UNITED STATES PATENTS

| 833,436 | Borland et al. | Oct. 16, 1906 |
| 2,240,349 | Preston | Apr. 29, 1941 |
| 2,348,279 | Boyles et al. | May 9, 1944 |
| 2,814,164 | Carson et al. | Nov. 26, 1957 |
| 2,872,756 | Jendrisak | Feb. 10, 1959 |
| 2,876,594 | McRoberts et al. | Mar. 10, 1959 |

FOREIGN PATENTS

| 3,181 | Netherlands | Mar. 13, 1919 |
| 1,097,088 | France | Feb. 9, 1955 |